US006871407B1

(12) United States Patent
Maegli

(10) Patent No.: US 6,871,407 B1
(45) Date of Patent: Mar. 29, 2005

(54) EQUATORIAL SUNDIAL WITH SIMPLE TIME AND DATE INTERPRETATION

(76) Inventor: Jack William Maegli, 713 S. Paddock Rd., Beloit, WI (US) 53511

(*) Notice: Subject to any disclaimer, the term of this patent is extended or adjusted under 35 U.S.C. 154(b) by 0 days.

(21) Appl. No.: 10/667,178

(22) Filed: Sep. 18, 2003

(51) Int. Cl.[7] .................................................. G01C 17/34
(52) U.S. Cl. .............................. 33/270; 33/271; 368/79
(58) Field of Search ...................... 33/270, 271; 368/79

(56) References Cited

U.S. PATENT DOCUMENTS 978,859 A * 12/1910 Dick ........................... 33/270
1,570,029 A * 1/1926 Balch .......................... 33/270
2,192,750 A * 3/1940 Mead .......................... 33/270
2,754,593 A * 7/1956 Sundblad ..................... 33/270
3,815,249 A * 6/1974 Gundlach .................... 33/269
4,102,054 A * 7/1978 Lewis ......................... 33/270
4,135,357 A * 1/1979 Ashton ........................ 368/15
4,237,611 A * 12/1980 Wurch et al. .............. 33/1 DD
5,181,324 A * 1/1993 Hein ........................... 33/270
6,604,290 B1 * 8/2003 Hughes, Jr. .................. 33/270

* cited by examiner

*Primary Examiner*—Christopher W. Fulton
*Assistant Examiner*—Tania Courson

(57) ABSTRACT

This invention represents an improvement to an equatorial sundial comprising an independent simultaneous single scale indication of both time and date as represented from a primary and secondary gnomon. This allows one unfamiliar with the physics of an equatorial sundial to with simple observation quickly assess both time and date as a singular measurement. The sundial displays conventional time measurement on a single scale transcribed on the equatorial ring from a primary gnomon aligned with the polar axis. The improvement includes a date scale transcribed on the primary gnomon that is cast a shadow from the secondary gnomon comprised of the upper equatorial ring. Since the sun maintains an essentially equivalent angle of declination throughout the day, the shadow cast by the upper equatorial ring (secondary gnomon) on the primary gnomon (containing the date scale) remains consistent in position and date can be observed at any time of the solar day.

4 Claims, 4 Drawing Sheets

EQUATORIAL SUNDIAL WITH SIMPLE TIME AND DATE INTERPRETATION

FIELD OF THE INVENTION

This invention pertains to equatorial sundials

BACKGROUND OF THE INVENTION

The basic equatorial sundial is comprised of a gnomon that is aligned with the star Polaris and essentially represents the axis of the earth. The time scale is composed of a semicircle that is aligned with the equatorial plane of the earth. On the time scale, hours of the day are separated by 15 degree increments that correspond with a one hour rotational angle of the earth. Refer to U.S. Pat. No. 2,754,593 (Sunblad), and U.S. Pat. No. 2,192,750 (Mead) which describe an adjustable time scale equatorial sundial.

Equatorial sundials have been described which can measure the date as well as time based on the declination of the sun:

U.S. Pat. No. 89,585 (Johnson) describes a blackened glass sphere with a hole to transmit a ray of sunlight against a two axis grid etched on the opposing surface of the glass. By interpreting alignment of the illuminated dot on one axis a time is determined and by interpreting alignment of the dot on the other axis, an approximate date can be assessed. Unfortunately because of the geometry of a sphere, resolution is only good during midday hours (high solar altitudes), and the observer must follow the grid pattern to extrapolate both date and time.

U.S. Pat. No. 4,102,054 (Lewis) describes an equatorial sundial with a cross hair gnomon (referred to as perpendicular interesting "cords or rods") that casts a conventional time shadow against an equatorial plane grid. An improvement to approximate date consists of an analemma scale on the approximate bottom half of the longitudinal ring. When the shadow from the intersection of the "cords or rods" passes through the analemma scale, a date can be determined. Unfortunately, this only occurs when the sun reaches maximum altitude (solar noon), and the intersecting shadows pass through the scale (a 30 minute period or less), so the date function has a finite time span of utility. A desirable improvement is a date scale that could be utilized regardless of time of day. This would require an equidistant relationship of the date gnomon and scale regardless of the solar altitude, which changes from sunrise to sunset even though solar declination is consistent.

U.S. Pat. No. 4,135,357 (Ashton) describes a solar chronometer comprised of a semi-cylindrical common time and date scale with a primary polar gnomon that casts a shadow on the x axis of the scale representing time and a secondary equatorial gnomon that casts a shadow on the y axis representing date. From the point where the shadows intersect, the observer must follow the grid to an x and y axis value to approximate the date and the time.

U.S. Pat. No. 4,237,611 (Wurch et al.) describes a shadow scope comprised of a semi-cylindrical scale with a crosshair gnomon that while not a sundial could be used as one. The gnomon casts a crosshair shadow on a two axis grid scale, one axis representing time, the other date. The observer must follow relation of the shadow intersection to an x and y axis value to approximate the date and the time.

U.S. Pat. Nos. 4,785,542 and 4,845,853 (Haskett) describe an equatorial sundial comprised of a point gnomon that casts a shadow dot on opposing semi cylinders, each containing a two axis time and date grid. The primary improvement is intended to be better scale resolution at low solar altitudes. Similar to U.S. Pat. No. 4,237,611, the user must follow relation of the shadow dot to an x and y axis value to approximate the date and the time.

U.S. Pat. No. 4,945,644 (Fuller) describes an equatorial sundial comprised of a gnomon bead casting a shadow on an inverted hemisphere containing a time and date grid. Similar to U.S. Pat. No. 4,237,611, the user must follow relation of the bead shadow to an x and y axis value to approximate the date and the time.

U.S. Pat. No. 5,062,212 (Blaker) describes a cross hair gnomon casting a shadow against a semi-cylindrical equatorial grid containing two axis for date and time. Similar to U.S. Pat. No. 4,237,611, the observer must follow relation of the shadow intersection to an x and y axis value to approximate the date and the time.

U.S. Pat. No. 5,197,199 (Shrader) describes a reflected dot sundial that by an anolimic scale can approximate both time and date. Like U.S. Pat. No. 89,585, this device losses resolution during low solar altitudes (beyond the midday hours) and requires the user to follow a grid pattern to extrapolate both time and date.

BRIEF DESCRIPTION OF THE INVENTION

This invention represents an improvement to an equatorial sundial comprising an independent simultaneous single scale indication of both time and date as represented from a primary and secondary gnomon. This allows one unfamiliar with the physics of an equatorial sundial to with simple observation quickly assess both time and date as a singular measurement on independent simple scales. The sundial displays conventional time measurement on a single scale transcribed on the equatorial ring from a primary gnomon aligned with the polar axis. The improvement includes a date scale transcribed on the primary gnomon that is cast a shadow from the secondary gnomon comprised of the upper equatorial ring. Since the sun maintains an essentially equivalent angle of declination throughout the day, the shadow cast by the upper equatorial ring (secondary gnomon) on the primary gnomon (containing the date scale) remains consistent in position and date can be observed at any time of the solar day.

The primary components of the invention consist of: a primary polar gnomon aligned with the star Polaris (or representing the polar axis aligned with the celestial north pole) to cast a shadow on a time scale, and a full circular equatorial ring with the bottom approximate half serving to support the time scale, and the upper approximate half serving as a secondary gnomon to cast a shadow through most of the day (regardless of solar altitude) to a date scale imposed on the primary polar gnomon. Since a set of 6 month intervals are represented by the sun passing from summer to winter solstice, the date scale is separated on opposing sides of the primary gnomon, one containing the spring equinox months (January–June) and the other containing the fall equinox months (July–December).

The improvement in using two separate scales (time on the equatorial grid and date on the primary gnomon grid) is that a user at a glance can see either the time or the approximate date independently and with simple interpretation. Two critical components are necessary for proper date representation on a single axis scale throughout the day; a constant secondary gnomon position with regard to the declination of the sun regardless of time of day, and an equidistant relationship between said gnomon and the date scale so the projected shadow always falls on the same point. The equatorial ring serves well for the purpose of the secondary gnomon since it is at a constant position with regard to the declination of the sun throughout the day and the primary (polar) gnomon serves best for the scale since it maintains an equidistant relationship with the equatorial ring regardless of solar time.

DETAILED DESCRIPTION OF THE INVENTION

Figure 1:
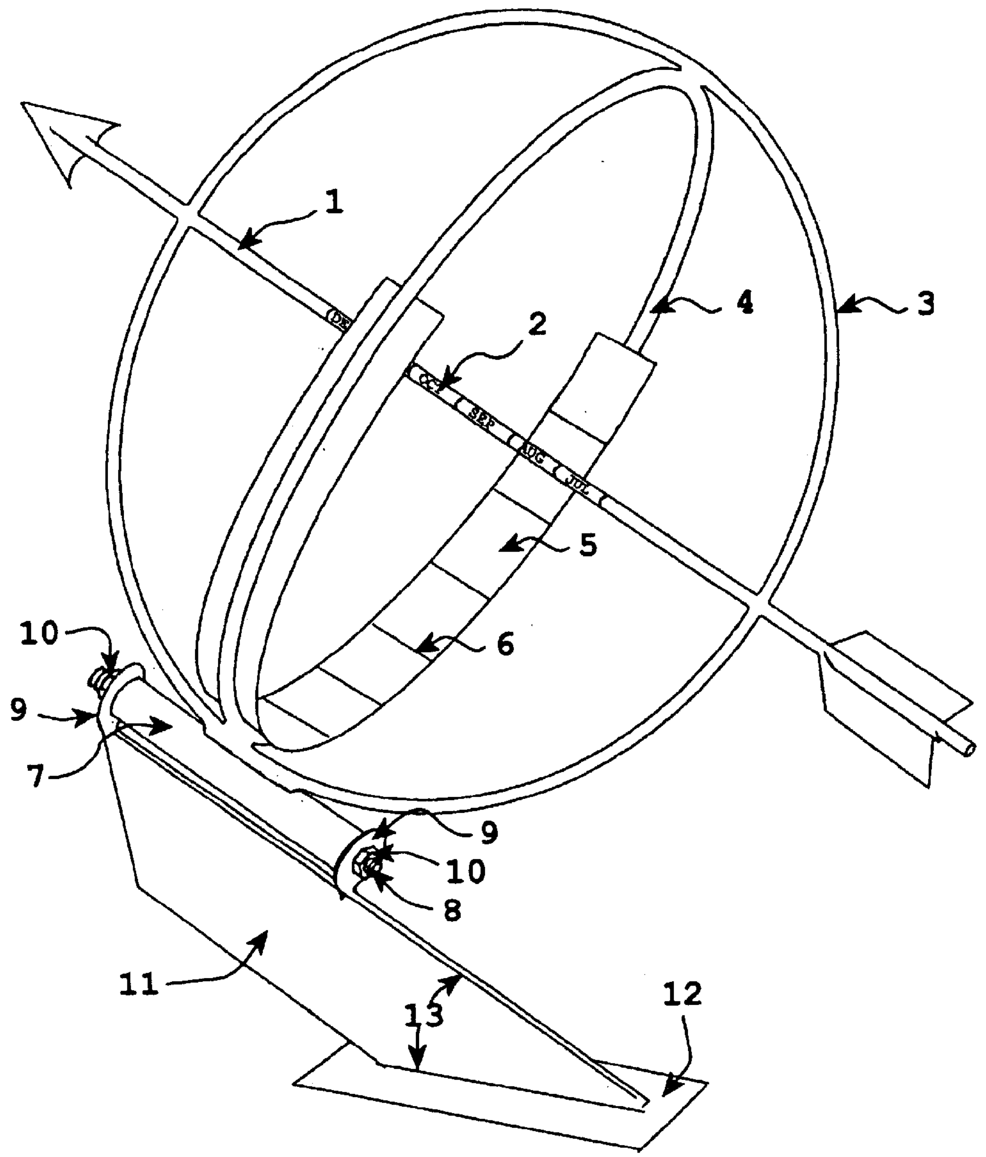
FIG. 1 shows a representation of the embodiment using an equatorial ring.

To practice the invention the user must first assess the size of the fabrication (the diameter of the equatorial ring). The author prefers iron round stock, of the approximate diameter of 5⁄16" for a 14" ring, which is easy to bend and weld. After forming a round equatorial ring, a meridian ring serving to support the primary gnomon is bent of which inner diameter (ID) will approximate the outer diameter (OD) of the equatorial ring. This ring is then cut in half excluding the thickness of the primary gnomon during cutting. The primary gnomon is fabricated from similar round stock, with artistic impressions (such as the likeness of an arrow) if desired. The assembly is welded together with the support ring halves in the same vertical plane as the primary gnomon forming a meridian ring. The equatorial ring is welded to the meridian support ring such that its plane is perpendicular to primary gnomon, corresponding to the equatorial plane of the earth.

A time scale is next established on the bottom approximate half of the equatorial ring consisting of either an impression on the equatorial ring round stock or a representation on flat stock iron (for enhanced visibility) welded to the equatorial ring. Since the top portion of the equatorial ring serves as a secondary gnomon for the date scale to be inscribed on the primary gnomon, in the case of a flat stock time scale one must assess a compromise in whether time or date interpretation is desired during early and late day conditions of low solar altitude (since the flat stock will cast a wide shadow on the primary gnomon). It is the author's preference to represent the time scale with flat stock at a 220 degree portion of the equatorial ring.

The equatorial ring (or flat stock) is impresioned at 15 degree increments representing the angular rotation of the earth in one hour. It is preferred to mark the lower center scribe with the numeral 12 representing noon time, the 15 degree increments preceding and following appropriated advanced or declined in hourly increments from this point.

The primary gnomon must be of thin enough material to cast a resolute shadow on the time grid, but thick enough to be inscribed with the date, usually represented with a scribe mark for the beginning and end of each month, preferably with sub-scribes for the beginning (and end) of each week within the month. For the fabrication previously described 5⁄16" round stock steel works well. The gnomon is ground slightly flat on opposing readable sides (east and west). On one side the 6 spring equinox months are inscribed (a letter punch works well), and on the other the 6 fall equinox months. To determine the location of the monthly scribe marks one needs to refer to the table for the declination of the sun on the first day of the 12 months as given by the US Naval Observatory. Applying the equation:

$$L=r*\mathrm{TAN}(d*PI/180)$$

Where:

L=Length (or distance) from equinox position. Equinox position defined as the intersection of the equatorial plane on primary gnomon (or longitudinal mid point) r=mean radius of equatorial ring with regard to the cross sectional center of the primary gnomon d=declination of the sun (in degrees) with regard to the celestial equator (positive value when north of the celestial equator, negative when south of the celestial equator)

Positive values of L indicate a position south of the equatorial plane intersection of the primary gnomon (since the shadow is cast on the inverse side of the equatorial position of the sun). Negative values of L indicate a gnomon position north of the equatorial center. As reference the equatorial plane intersection of the gnomon, or L=0, is the point represented by the shadow cast at the solar equinox.

FIG. 1 shows a basic representation of the embodiment described, comprised of a primary gnomon (1) with inscribed monthly date (2) supported by an upper and lower meridian ring structure (3). An equatorial ring (4) is oriented in a plane perpendicular to the primary gnomon with a time scale (5) affixed with scribes (6) indicating the hour at 15 degree radial increments. The equatorial ring material diameter must be sufficiently small enough to cast a resolute shadow on the date scale of the primary gnomon. A bushing (7) is fastened to the sundial assembly parallel to the primary gnomon, allowing rotation within the equatorial plane for time calibration and to adjust for daylight savings time. Thread stock (8) follows through the bushing and support washers (9) welded to a base. The sundial and base is secured in desired position with end nuts (10) on the thread stock. The base (11) and mounting plane (12) are fabricated and assembled such that the base represents the latitude in degrees (13) where the sundial will be displayed. Alternatively an adjustable angle mount can be fabricated for display at a variety of latitudes as described later.

Figure 2:
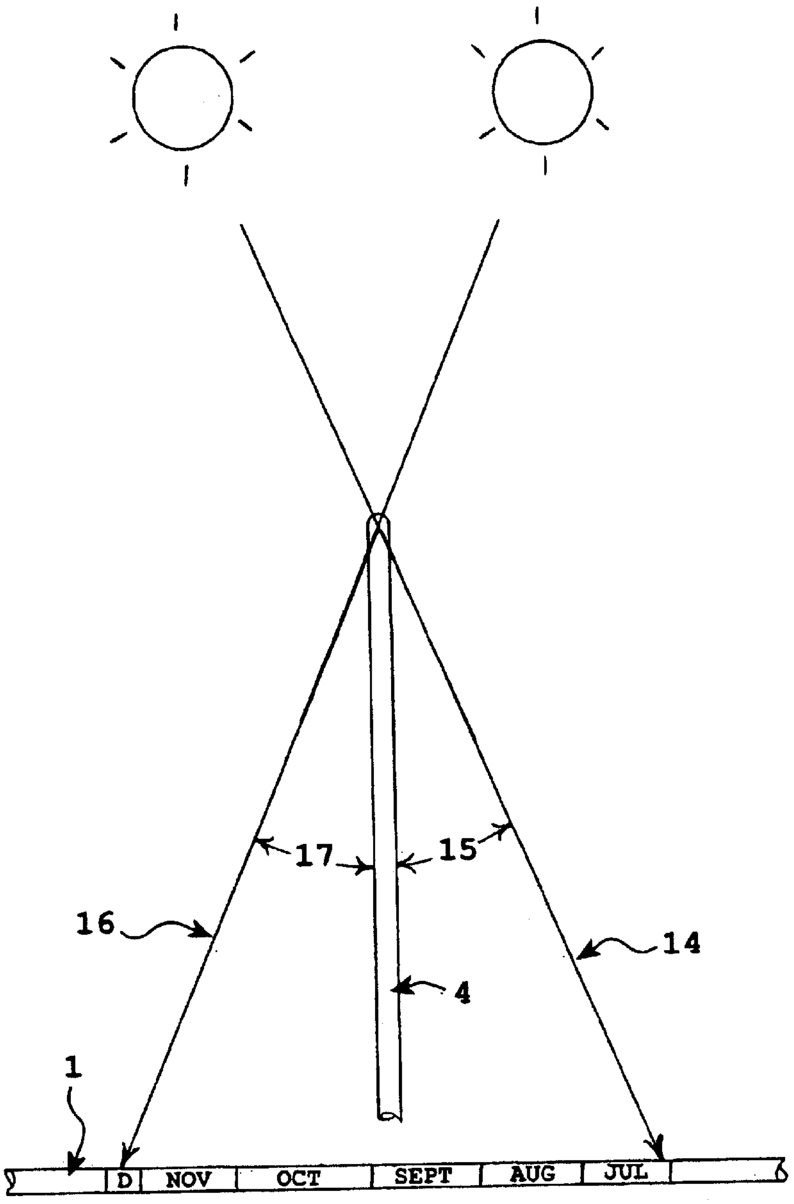
FIG. 2 shows a western side view containing a partial representation of the upper equatorial ring (4), broken to show projection of the sun at the summer (14) and winter (16) solaces. The left side of the primary gnomon (1) depicted at the bottom points toward the star Polaris.

FIG. 2 is a view from the western side of the sundial showing the upper portion of the equatorial ring (4) which acts as the secondary gnomon for casting a shadow indicating the date on the primary gnomon (1). At the summer solstice, the sun is at the northernmost side of the equatorial ring and casts a shadow (14) on the summer solstice date on the primary gnomon, representing the earth's maximum declination relative to the sun of 23 degrees 26 minutes (15). At the winter solstice, the sun is at the southernmost side of the equatorial ring and casts a shadow (16) on the winter solstice date on the primary gnomon, representing the earth's minimum declination relative to the sun of minus 23 degrees 26 minutes (17).

Figure 3:
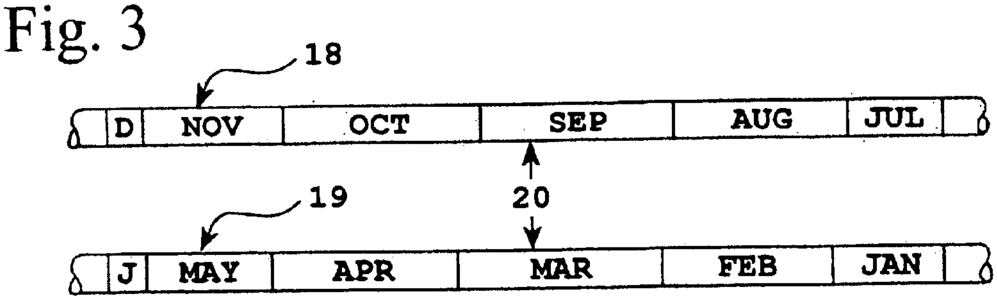
FIG. 3 shows a detailed view of both sides of the primary gnomon. The upper drawing (18) shows the fall equinox months, with the left side pointing toward the star Polaris. The lower drawing (19) shows the spring equinox months, with the right side pointing toward the star Polaris.

FIG. 3 shows a detailed view of the date scale represented on the primary gnomon. Since the summer and winter equinox months overlap with respect to the earths declination cycle, it is pragmatic to separate the two on the east and west side of the gnomon. The fall equinox months in the upper drawing (18) are represented on the west side of the gnomon and the spring equinox months in the lower drawing (19). Thus, in the upper drawing the left side of the gnomon points toward Polaris and in the lower drawing the right side points toward Polaris. The date scales can obviously be reversed from the aforementioned sides as long as the scale respects the monthly declination angle of the earth relative to the sun. The intersection of the equatorial plane representing the equinox position of the sun falls at the mid point of the gnomon (20).

Example of Calculating Date Scale on Primary Gnomon

The longitudinal midpoint of the primary gnomon (which should correspond to the intersection of the equatorial plane) represents the shadow position at solar equinox, or 0 degrees of the solar declination. All date locations will be based on this reference point. In this case we will use ⅜" round stock to fabricate an equatorial ring of 16" mean diameter (15¹³⁄₁₆" ID, 16³⁄₁₆" OD) with corresponding 8" mean radius. Using the equation: L=r*TAN(d*PI/180) and the declination of the sun (in degrees) for the first day of each month (from the US Naval Observatory) we get the following date locations from the equinox point of the gnomon:

| | Declination angle (deg) | Location from equinox point (in.) |
|---|---|---|
| Spring Equinox | | |
| Months | | |
| Jan 1 | −23.1 | −3.41 |
| Feb 1 | −17.33 | −2.49 |
| March 1 | −7.82 | −1.10 |
| April 1 | 4.3 | 0.60 |
| May 1 | 14.9 | 2.13 |
| June 1 | 21.97 | 3.23 |
| Summer Solstice | 23.5 | 3.48 |
| Fall Equinox | | |
| Months | | |
| July 1 | 23.15 | 3.42 |
| Aug 1 | 18.17 | 2.62 |
| Sept 1 | 8.5 | 1.19 |
| Oct 1 | −2.95 | −0.41 |
| Nov 1 | −14.23 | −2.03 |
| Dec 1 | −21.72 | −3.19 |
| Winter Solstice | −23.5 | −3.48 |

The spring equinox months are represented on one side of the gnomon and the Fall Months on the other. Positive values of L are scribed south of the equinox point of the gnomon. Negative values of L are scribed north of the equinox point. The months of June and December must be extended to include the solstice distance as well, since the solstice falls within those particular months.

Alternative Representation of the Invention

Figure 5:
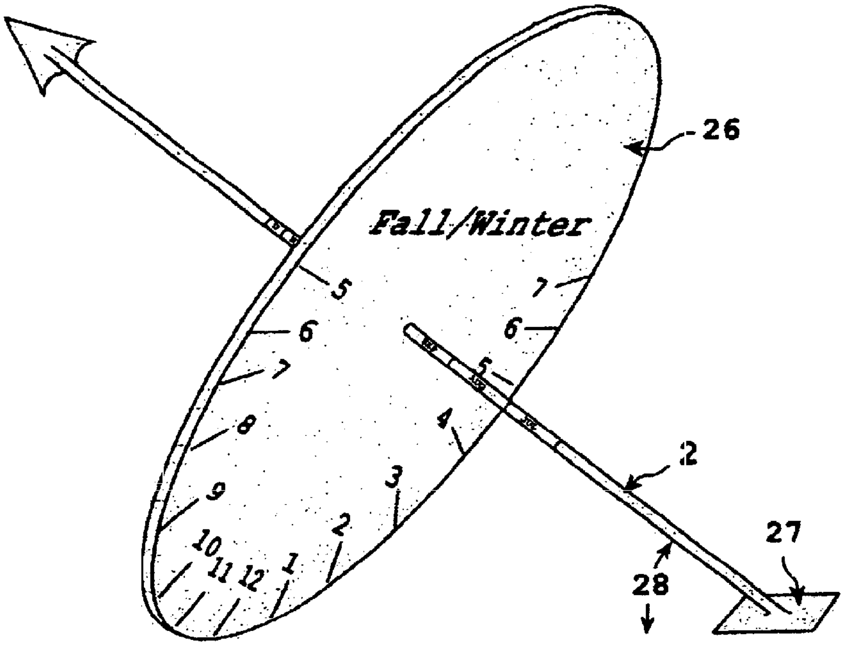
FIG. 5 shows a representation of the embodiment using an equatorial disc.
Figure 6:
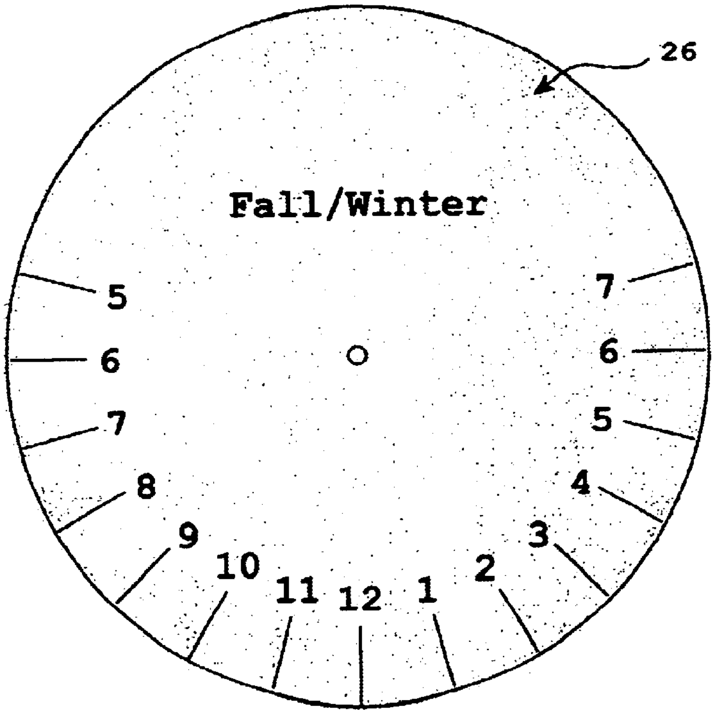
FIG. 6 shows a south view of the equatorial disc represented in the embodiment of FIG. 5.

FIGS. 5–6 show an equatorial sundial where the equatorial ring has been replaced with a solid disc (26). The gnomon (2) has been extended on the southern end to rest along with the disc on a flat surface (27). This length is adjusted such that the angle between the horizon and the gnomon (28) is equal to the latitude of placement.

It is obvious to someone familiar with the art that replacing the equatorial ring of this invention with a solid disc (26) would produce a device with similar independent time and date function. In this case, the equatorial disc casts a solid shadow on the primary gnomon from the equinox point to the date. Since the edge of the shadow is where the date is read, when calculating date position of the primary gnomon with the formula L=r*TAN(d*PI/180) the term r must represent the distance from the center of the gnomon to the outer diameter of the equatorial disc.

In the case of using an equatorial disc, the time may be read on a scale inscribed on the periphery of the approximate bottom half of the disc as an alternative to, or in combination with the scale described on the approximate bottom half of the equatorial ring. Either is scribed at 15 degree radial increments representing the hour. Since the sun will cast a shadow on the northern surface of the disc during the spring and summer and on the southern surface during the fall and winter, both sides must be scribed for hourly time.

Adjustable Latitudinal Mount

Figure 4:
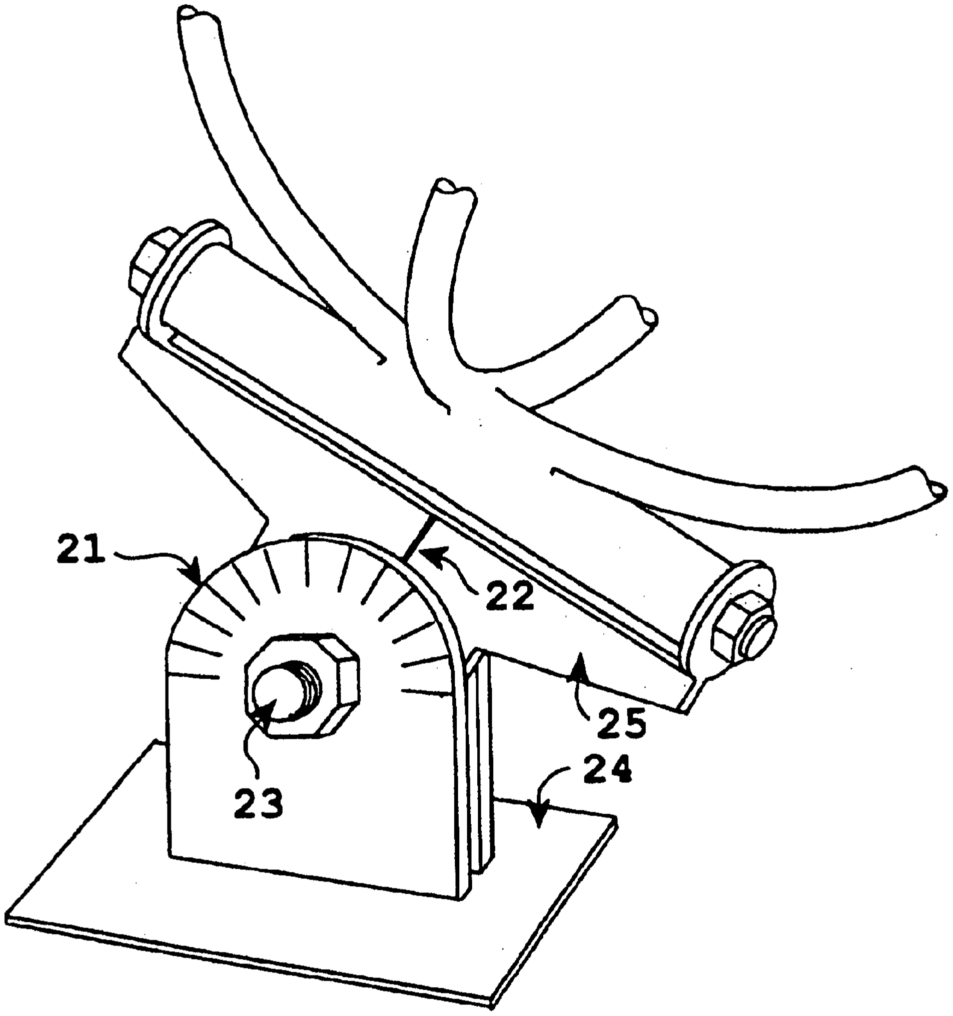
FIG. 4 shows a modified mount to accommodate latitude adjustment of the equatorial sundial.

In the case of either embodiment described, a mount adjustable in the latitudinal (or meridian plane) as well as longitudinal (or equatorial plane) direction may be employed as shown in FIG. 4. The latitude can be adjusted with use of an angle level referenced to the pitch of the gnomon relative to the horizontal plane. Alternatively, a protractor scale (21) is represented on the lower fixed mount, with a reference mark intersecting the equatorial plane (22) on the adjoining upper sundial mount indicating relative inclination to the horizon, or latitude of installation. A through bolt (23) affixes the lower (24) and upper (25) mount.

What is claimed is:

1. An equatorial ring sundial containing a single and independent time scale and a single and independent date scale, both of utility regardless of solar altitude (or time of day) comprised of:

a primary polar gnomon with superimposed date scale for projecting a shadow on the time scale and receiving a projected shadow from a secondary gnomon to determine a date;

wherein the date scale is superimposed on a linear section of the primary gnomon;

an equatorial ring: the approximate top half serving as the secondary gnomon for projecting the shadow at a consistent position on the primary gnomon date scale regardless of solar altitude or time of day;

the time scale represented on the approximate bottom half of the equatorial ring.

2. The embodiment of claim 1 where the primary gnomon has a date scale of the spring equinox months on one side and the fall equinox months on the other.

3. The embodiment of claim 2 where a pivotal axle mounted perpendicular to the equatorial plane between the equatorial ring and a mounting bracket allows adjustment to compensate for the longitudinal location and daylight savings time.

4. The embodiment of claim 3 where the mounting bracket includes an adjustable latitude angular adjustment.

* * * * *